(12) United States Patent
Sauer

(10) Patent No.: US 9,291,380 B2
(45) Date of Patent: Mar. 22, 2016

(54) THERMODYNAMIC CYCLE PROCESS SYSTEM

(71) Applicant: ebm-papst Mulfingen GmbH & Co. KG, Mulfingen (DE)

(72) Inventor: Thomas Sauer, Bad Mergentheim (DE)

(73) Assignee: ebm-papst Mulfingen GmbH & Co. KG, Mulfingen (DE)

( * ) Notice: Subject to any disclaimer, the term of this patent is extended or adjusted under 35 U.S.C. 154(b) by 0 days.

(21) Appl. No.: 14/429,506

(22) PCT Filed: Jul. 26, 2013

(86) PCT No.: PCT/EP2013/065803
§ 371 (c)(1),
(2) Date: Mar. 19, 2015

(87) PCT Pub. No.: WO2014/044452
PCT Pub. Date: Mar. 27, 2014

(65) Prior Publication Data
US 2015/0253052 A1 Sep. 10, 2015

(30) Foreign Application Priority Data
Sep. 20, 2012 (DE) .......................... 10 2012 108 869

(51) Int. Cl.
| | |
|---|---|
| H02P 6/06 | (2006.01) |
| F25B 49/02 | (2006.01) |
| H02M 1/44 | (2007.01) |
| H02M 5/458 | (2006.01) |
| H02J 9/06 | (2006.01) |
| H02P 6/00 | (2006.01) |
| H02P 6/04 | (2006.01) |
| H02M 1/00 | (2007.01) |

(52) U.S. Cl.
CPC ............... *F25B 49/025* (2013.01); *H02J 9/062* (2013.01); *H02M 1/44* (2013.01); *H02M 5/458* (2013.01); *H02P 6/001* (2013.01); *H02P 6/04* (2013.01); *H02M 2001/0006* (2013.01); *H02M 2001/007* (2013.01); *H02M 2001/008* (2013.01)

(58) Field of Classification Search
CPC .......... F25B 49/025; H02P 6/001; H02P 6/04
USPC ....................................... 318/400.3
See application file for complete search history.

(56) References Cited

U.S. PATENT DOCUMENTS

| | | | |
|---|---|---|---|
| 6,317,012 B1 | 11/2001 | Coffey | |
| 2007/0151272 A1 | 7/2007 | Cosan et al. | |
| 2012/0047911 A1 | 3/2012 | Bhavsar et al. | |

FOREIGN PATENT DOCUMENTS

| | | |
|---|---|---|
| JP | 2001178173 A | 6/2001 |
| WO | WO-2004109892 A2 | 12/2004 |
| WO | WO-2011139269 A1 | 11/2011 |

OTHER PUBLICATIONS

International Search Report (in German with English Translation) for PCT/EP2013/065803, mailed Oct. 15, 2013; ISA/EP.
International Preliminary Report on Patentability for PCT/EP2013/065803 with Annex, issued Dec. 2, 2014; ISA/EP.

*Primary Examiner* — Erick Glass
(74) *Attorney, Agent, or Firm* — Harness, Dickey & Pierce, P.L.C.

(57) ABSTRACT

The present invention relates to a thermodynamic cycle process system comprising at least two heat exchangers, an EC compressor, and a combination of electronic components such as EC fans, electronic regulator valves and/or EC pumps. A central supply electronics unit can be connected to an AC voltage source, wherein the electronic components have an integrated power electronics device which produces the PWM operating voltage required for the electronic components. The central supply electronics unit is connected to the individual integrated power electronics devices for the electronic components, and produces the supply voltages required for the respective power electronics devices.

3 Claims, 4 Drawing Sheets

THERMODYNAMIC CYCLE PROCESS SYSTEM

CROSS REFERENCE TO RELATED APPLICATIONS

Figure 1:
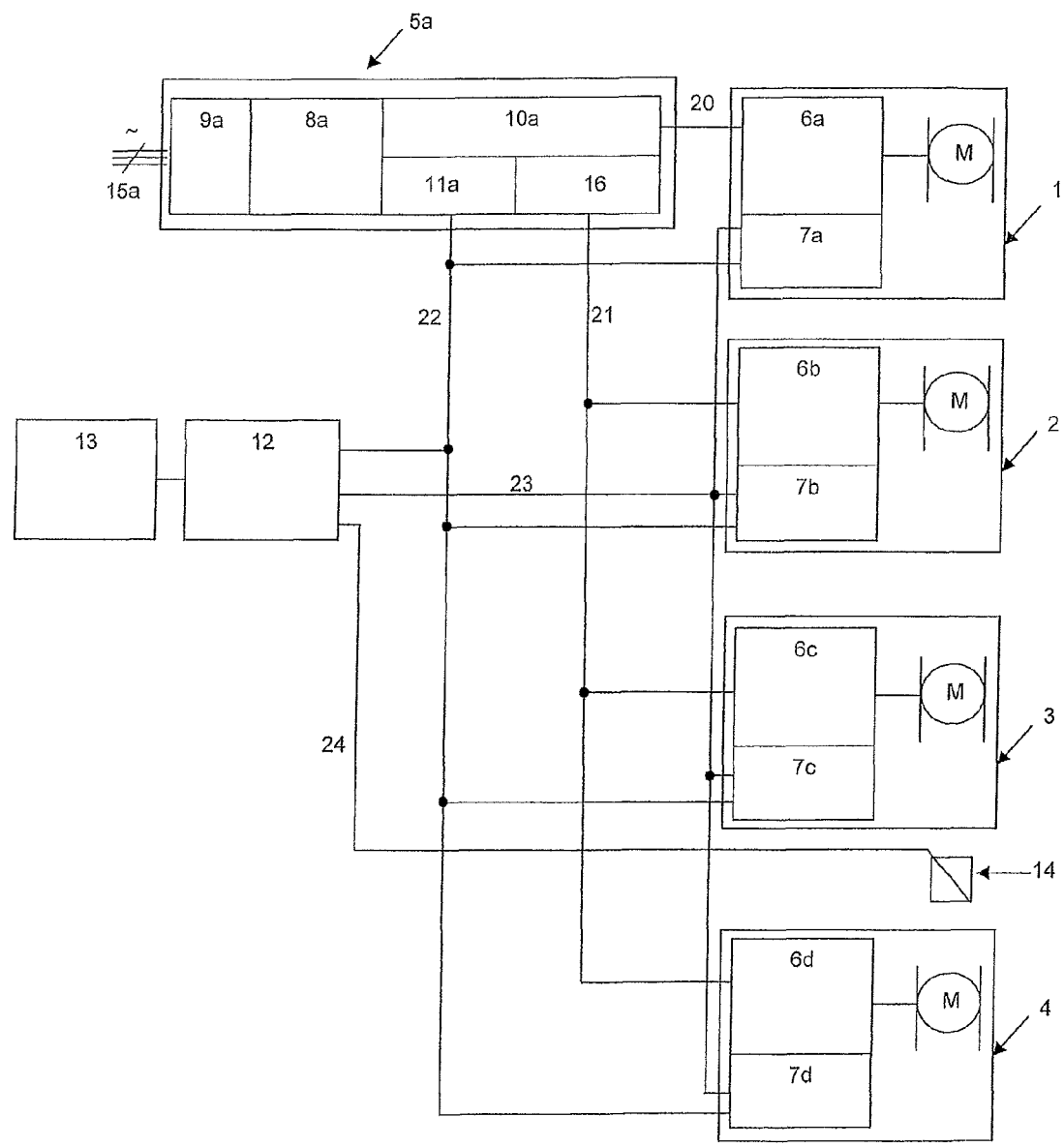

This application is a U.S. National Phase Application under 35 U.S.C. 371 of International Application No. PCT/EP2013/065803 filed on Jul. 26, 2013 and published as WO 2014/044452 A1 on Mar. 27, 2014. This application is based on and claims the benefit of priority from German Application No. 10 2012 108 869.1 filed on Sep. 20, 2012. The entire disclosures of all of the above applications are incorporated herein by reference.

The present invention relates to a thermodynamic cycle process system comprising at least two heat exchangers, an EC compressor and a combination of electronic components such as EC fans, electronic regulator valves and/or EC pumps.

Such systems are used, for example, as heat pumps in heating systems or as chillers in air conditioning systems. In the process, one heat exchanger is designed as a condenser and the other one as an evaporator. A fan is usually affixed to the heat exchangers. In order to increase the efficiency of the whole system, electronically controlled components are used instead of electrical and thermomechanical components. For example, EC (electronically commutated) fans are used instead of AC fans and EC (electronically commutated) compressors (also called brushless DC compressors or BLDC compressors) are used instead of AC compressors. Instead of a thermostatic expansion valve, an electronic regulator valve is used. By switching to electronic components, an independent control or regulation of the individual components is possible by a central regulator such that the efficiency of the whole system can be maximised at every operating point. In the process, the EC compressor, EC fans and EC pump in particular are controlled or regulated by a PWM (pulse width modulation) modulated operating voltage respectively. The PWM operating voltage for EC compressors and EC fans used in these systems is normally between 400 V to 700 V hub and 15 kHz to 20 kHz PWM frequency.

Thermodynamic cycle process systems are known where the individual electronic components each have their own decentralised electronic units having their own supply electronics for voltage supply and a power electronics which has a control unit for controlling or regulating the electronic components. The power electronics serves to generate the PWM operating voltage. The decentralised electronic units of the individual electronic components are connected independently of one another to the respective required voltage source, for example a three-phase 400 V AC source or a conventional two-phase 230 V AC source by means of their supply electronics. In order to control and regulate the thermodynamic cycle process, the thermodynamic cycle process system comprises an additional central regulator unit, in particular having a central user interface. The central regulator unit is connected to the control units of the individual electronic components and additional sensors. The sensors provide operating parameters as input signals for the regulator unit. One disadvantage of these thermodynamic cycle process systems is the high redundancy of the electronic components in the individual electronic components, in particular in the supply electronics and the power electronics. Each supply electronics normally has an EMC (electromagnetic compatibility) filter, an input current limiter and an AC/DC and/or DC/DC voltage transformer. The costs of these devices are considerable and therefore such thermodynamic cycle process systems bring about relatively high costs.

Apart from this, thermodynamic cycle process systems are known in which the individual electronic components are operated by a central electronic unit. To this end, the individual electronic components are provided without integrated electronic units. Instead of this, the central electronic unit comprises the supply electronics for all of the components, in particular having an input current limiter, an EMC filter and at least one voltage transformer. Furthermore, the central electronic unit comprises a plurality of power electronics to generate the various PWM modulated voltages for the individual electronic components. To this end, the individual electronic components, in particular those designed as motors, are each connected to the central electronic unit by separate lines. Such a thermodynamic cycle process system has the advantage that it can be produced cost-effectively in large numbers since electronic components can be omitted. It does have the disadvantage, however, that the electronic unit, in particular the supply electronics, has to be specially adapted to the power ranges of the electronic components used, such that flexible use of alternative electronic components with other power ranges is not possible, or is only possible to a limited extent. Apart from this, adverse electromagnetic radiation occurs due to the relatively long lines from the central electronic unit to the individual electronic components, which can have a negative effect, in particular on the central electronic unit or the respective other electronic components.

Such generic cycle process systems are known from US 2012/0047911 A1, WO 2011/139269 A1, US 2007/0151272 A1 and WO 2004/109892 A2.

From JP 2001/178173 A an air conditioning device having a brushless fan motor is known, wherein an inverter and a monolithic integrated circuit as a single component having an integrated input-output control are incorporated into the fan motor. In this way the output of the air conditioning device can be increased by controlling the input DC voltage of the motor together with pulse width modulation control of the inverter.

From U.S. Pat. No. 6,317,012 B1 a media converter system for use in data networks is known which is able to convert a signal transmission from one medium, e.g. a twisted pair cable, into another medium, e.g. fibre-optical systems. In this case, electric power from power supply devices is distributed to downstream devices.

Proceeding from the generic prior art it is therefore the object of the invention to provide a thermodynamic cycle process system, which can be produced as cost-effectively as possible and in which at the same time flexibility in the selection of the individual components with different power ranges is ensured and the electromagnetic radiation is as low as possible. In particular it is an object to improve the voltage/current control for the respective required supply voltages/currents of single components and to avoid electromagnetic interference in the supply lines.

Such a thermodynamic cycle process system allows components to be omitted, since the supply electronics is designed as a central electronic unit. As a result of this, electronic components, in particular input current limiters, EMC filters and voltage transformers are omitted. The supply electronics provides the supply voltages for the various components, the transmission of which, however, is not critical in relation to electromagnetic radiation. At the same time the integration of the power electronics in the respective components allows for a particularly short connection between the power electronics and the electronic components such that the electromagnetic radiation brought about by the transmission of the PWM operating voltage is minimised. Furthermore, a flexible adjustment of the thermodynamic cycle process system to different power ranges is possible since the electronic components can be replaced by other electronic components with different power ranges without having to adjust the central electronic unit.

Figure 2:
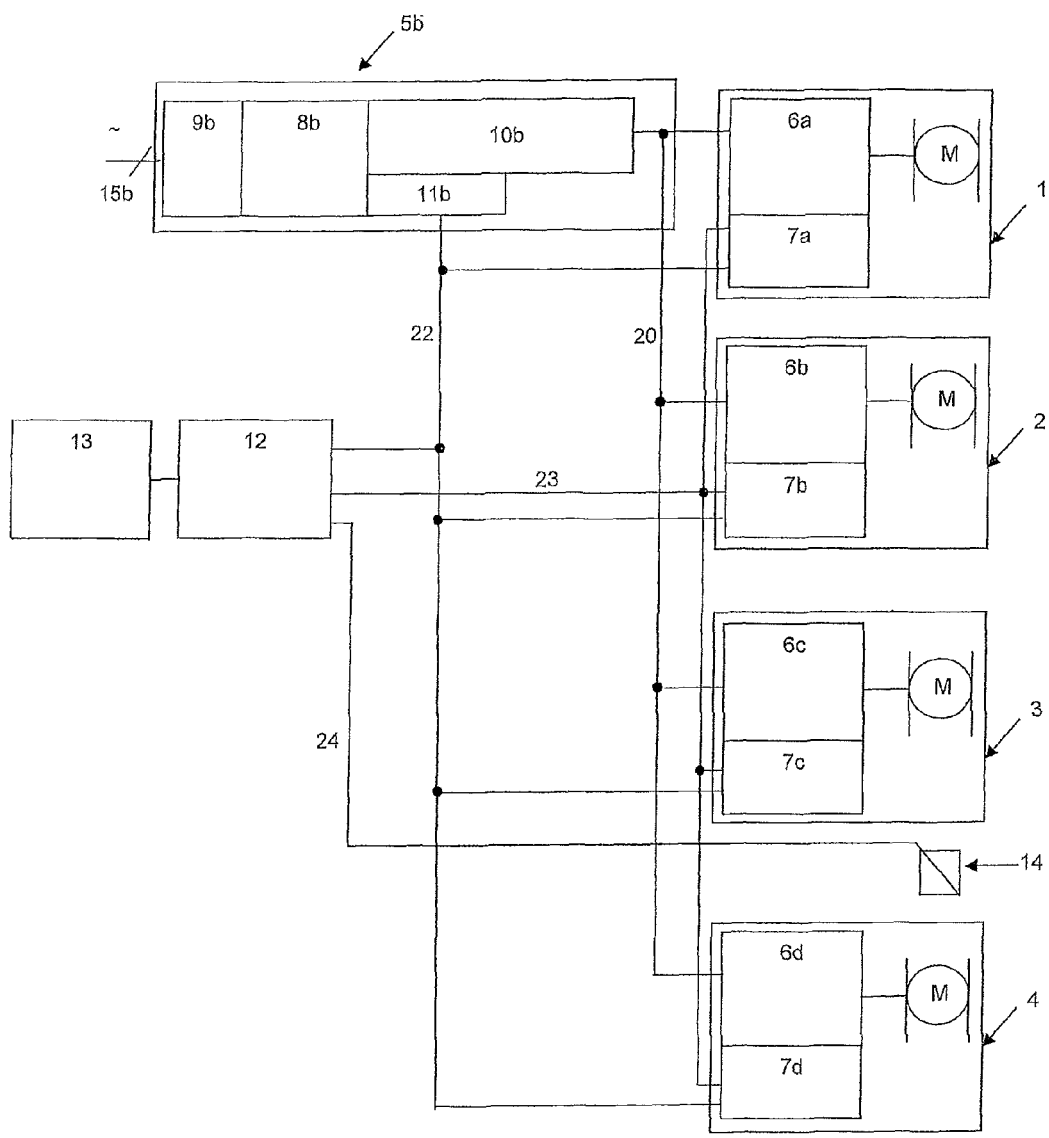
Figure 3:
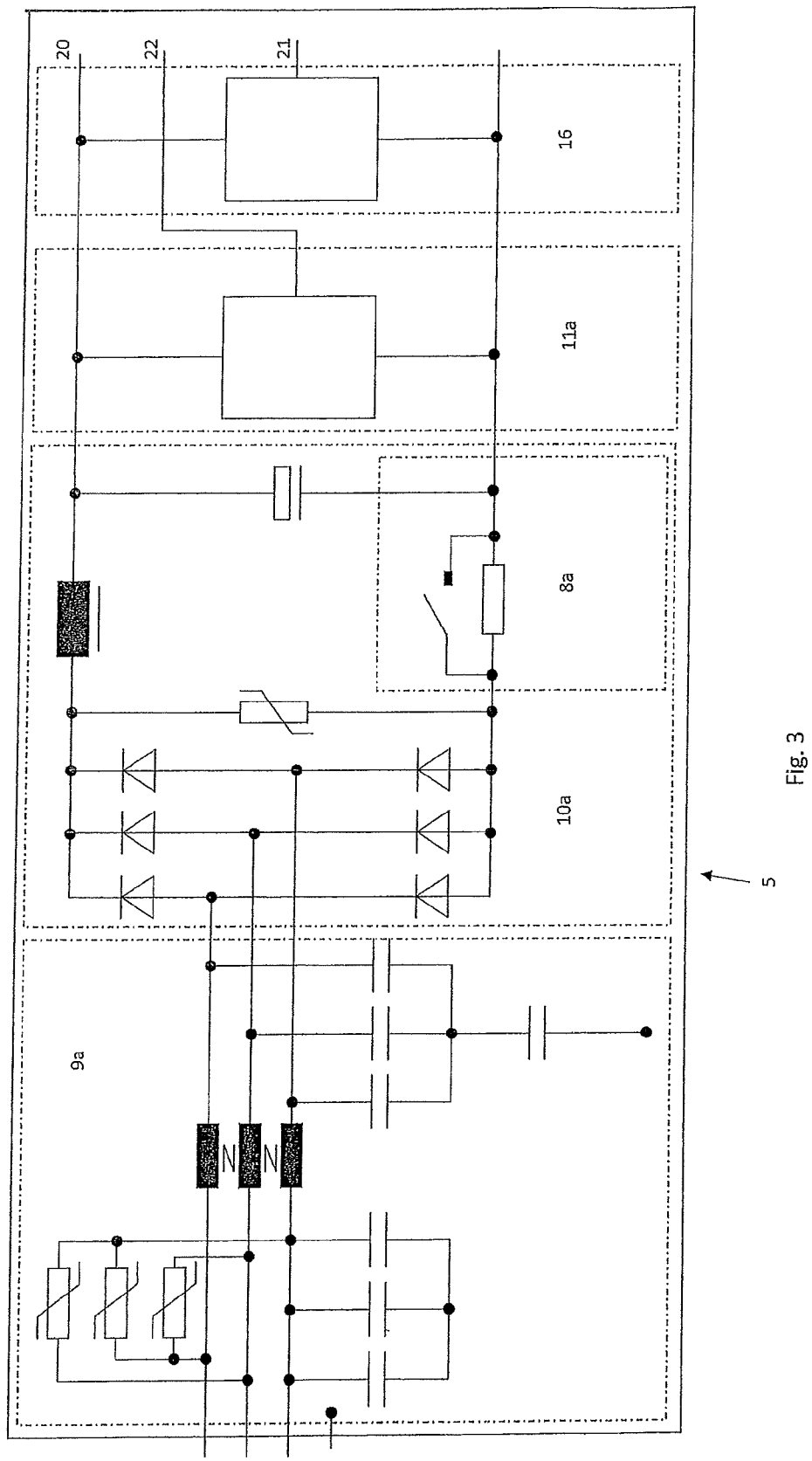
Figure 4:
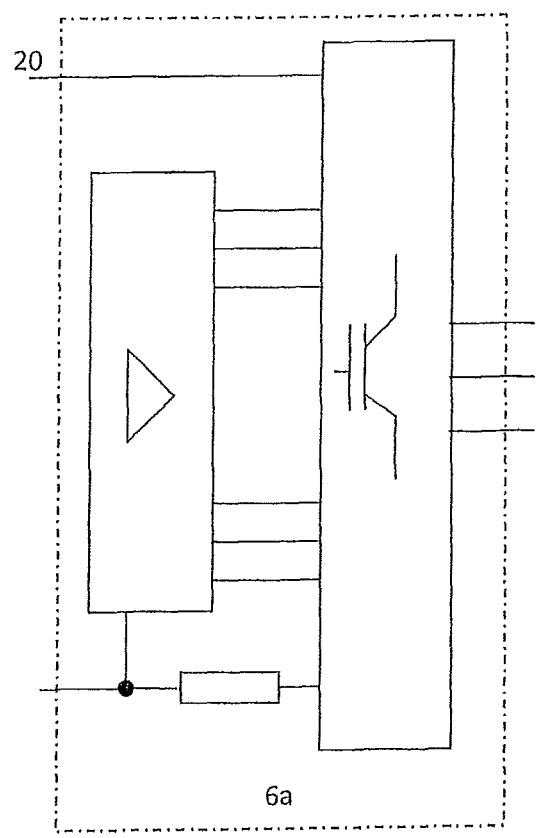

Further details, features and advantageous developments of the invention will emerge from the sub-claims and the embodiments which are shown in the drawings, in which:

FIG. 1 is a system diagram of a first embodiment of a thermodynamic cycle process system according to the invention for a three-phase AC voltage source, FIG. 2 is a system diagram of a second embodiment of a thermodynamic cycle process system according to the invention for a single-phase AC voltage source, FIG. 3 is a circuit diagram of an embodiment of a central supply electronics of a thermodynamic cycle process system according to the invention, and FIG. 4 is a circuit diagram of an embodiment of an integrated power electronics of an electronic component of a thermodynamic cycle process system according to the invention.

Same parts are always provided with the same reference numerals in the various drawings.

It is expressly emphasised with reference to the following description that the invention is not restricted to the embodiments and in the process not to all or a plurality of features of described combinations of features; on the contrary each individual sub-feature of the/each embodiment can also have an inventive relevance per se, independently of all the other sub-features described in conjunction therewith, and also in combination with any features of another embodiment and irrespective of the combinations of features and dependency references of the claims.

FIG. 1 and FIG. 2 are system diagrams of two embodiments of a thermodynamic cycle process system according to the invention. Each thermodynamic cycle process system shown comprises a plurality of electronic components, in particular an EC compressor 1, an EC fan 2, an electronic regulator valve 3 and an EC pump 4. The EC compressor 1 is configured in particular as a BLDC compressor. The regulator valve 3 is in particular an electronic expansion valve. Each of the electronic components comprises an integrated power electronics 6a, 6b, 6c, 6d and an integrated control unit 7a, 7b, 7c, 7d. The control units 7a, 7b, 7c and 7d serve to control the power electronics 6a, 6b, 6c, 6d and each comprise a control interface by means of which they are connected to an external central regulator unit 12 by means of the connection lines 23. The connection lines 23 serve as control lines and consist in particular of bus lines, in particular for a modbus. The external regulator unit 12 serves to regulate the thermodynamic cycle process and controls the various electronic components overall such that an optimal efficiency of the cycle process system is facilitated. Moreover, the regulation is based on input signals from external sensors 14, which are connected to the regulator unit 12 by means of the connection line 24. Moreover, an optional operating device 13, with which operating parameters can be set by the user, is connected to the regulator unit 12.

Apart from this, the respective thermodynamic cycle process system comprises a central supply electronics 5a, 5b. The supply electronics 5a, 5b can be connected to an AC voltage source 15a, 15b and in particular comprises an input current limiter 8a, 8b, an EMC filter 9a, 9b, an intermediate circuit 10a, 10b and at least one voltage transformer 11a, 11b, 16. The input current of the supply electronics 5a, 5b is limited by means of the input current limiter 8a, 8b to prevent adverse current peaks. The supply electronics 5a, 5b can be connected to either a three-phase AC voltage source 15a, in particular with 400 V AC, as in the first embodiment according to FIG. 1, or a single-phase AC voltage source 15b, in particular with 230 V AC, as in the second embodiment according to FIG. 2. Adverse electromagnetic radiation is filtered by the EMC filter 9a, 9b. By means of the intermediate circuit 10a, 10b and the voltage transformers 11a, 16 according to the first embodiment and the voltage transformer 11b according to the second embodiment, three or two different supply voltages respectively are provided for the electronic components 1, 2, 3, 4.

In the first embodiment according to FIG. 1, a first supply voltage is transmitted by means of the connecting line 20 from the intermediate circuit 10a of the supply electronics 5a to the EC compressor 1, in particular to its power electronics 6a. The first supply voltage is between 300 V and 600 V, in particular 565 V. A second supply voltage is transmitted by means of the connecting line 21 from the voltage transformer 16 of the supply electronics 5a to the EC fan 2, the electronic regulator valve 3 and the EC pump 4, in particular to their power electronics 6b, 6c, 6d. The second supply voltage is between 30 V and 400 V and in particular 48 V or 325 V. A third supply voltage is transmitted by means of the connecting line 22 from the voltage transformer 11a of the supply electronics 5a to the EC compressor 1, the EC fan 2, the electronic regulator valve 3, the EC pump 4, in particular to their control units 7a, 7b, 7c, 7d, and the central regulator unit 12. The third supply voltage is between 3 V and 42 V and in particular 5 V.

In the second embodiment according to FIG. 2, a first supply voltage is transmitted by means of the connecting line 20 from the intermediate circuit 10b of the supply electronics 5b to the EC compressor 1, the EC fan 2, the electronic regulator valve 4 and the EC pump 4, in particular to their power electronics 6a, 6b, 6c, 6d. The first supply voltage is between 30 V and 400 V, in particular 48 V or 325 V. A second supply voltage is transmitted by means of the connecting line 22 from the voltage transformer 11b of the supply electronics 5b to the EC compressor 1, the EC fan 2, the regulator valve 3, the EC pump 4, in particular to their control units 7a, 7b, 7c, 7d, and the central regulator unit 12. The second supply voltage is between 3 V and 42 V, in particular 5 V.

The supply voltages are unmodulated DC voltages such that no capacitive interference can occur from the connecting lines 20, 21, 22.

FIG. 3 is a circuit diagram of an embodiment of the supply electronics 5a by way of example. The embodiment shown of the supply electronics 5a can be connected to a three-phase AC voltage source 15a, in particular with 400 V AC. The supply electronics 5a limits current peaks of the three-phase AC voltage by means of the input current limiter 8a. Moreover, the electromagnetic interference is filtered by the EMC filter 9a. The three-phase AC voltage is transformed by an AC/DC voltage transformer 10a into a first supply voltage of in particular 565 V DC for the power electronics 6a of the EC compressor 1 and supplied to a connection for the connecting line 20. A second supply voltage of in particular 325 V DC is transformed by the DC/DC transformer 16 for the power electronics 6b of the EC fan 2, the power electronics 6c of the EC pump 3 and for the power electronics 6d for the expansion valve 4 and supplied to a connection for the connecting line 21. Moreover, the first supply voltage is transformed by means of a DC/DC voltage transformer 11b into a third supply voltage of in particular 5 V DC for the control units 7a, 7b, 7c, 7d of the electronic components, the EC compressor 1, the EC fan 2, the electronic regulator valve 3, the EC pump 4 and for the regulator unit 12 and supplied to a connection for the connecting line 22.

FIG. 4 is a schematic view of an example of an integrated power electronics 6a, 6b, 6c, 6d for a motor. The power electronics 6a, 6b, 6c, 6d consists by way of example of a driver, a power output stage as an IGBT switch and a current sensing resistor and is supplied via the connecting line 20 with a supply voltage of the supply electronics 5a, 5b.

As a result of the central supply electronics 5a, 5b, components are omitted in each of the electronic components 1, 2, 3, 4 so that such a thermodynamic cycle process system can be produced cost-effectively. Since each electronic component 1, 2, 3, 4 has its own respective power electronics 6a, 6b, 6c, 6d and the associated control unit 7a, 7b, 7c, 7d, it is possible to produce other power ranges for the thermodynamic cycle process system with the same supply electronics device 5. To this end, the relevant electronic components 1, 2, 3, 4 are replaced by more powerful or less powerful electronic components 1, 2, 3, 4. In the process, the supply electronics 5a, 5b does not have to be adjusted, however, since the supply voltages for the electronic components 1, 2, 3, 4 with other power ranges are the same and can be provided cost-effectively with the necessary power.

Moreover, the electromagnetic interfering radiation, which occurs as a result of the PWM operating voltages on the connecting lines from the power electronics 6a, 6b, 6c, 6d to the consumers of the electronic components 1, 2, 3, 4, in particular the motor of the EC compressor 1 and of the EC fan 2, is greatly reduced since these connecting lines can be designed to be particularly short as a result of the integration of the power electronics 6a, 6b, 6c, 6d in the electronic components 1, 2, 3, 4.

The invention is not restricted to the embodiments shown and described, but rather covers all embodiments with the same effect within the meaning of the invention. It is expressly emphasised that the embodiments are not restricted to all features in combination; on the contrary each individual sub-feature can also have an inventive relevance per se even independently of all the other sub-features. Furthermore, the invention is not hitherto restricted to the combinations of features defined in claim 1 either, but rather can also be defined by any other combination of certain features out of all individual features disclosed. This means that in principle practically any individual feature of claim 1 can be omitted or replaced by at least one individual feature disclosed in another place in the application. In this respect claim 1 is simply to be understood as a first attempt at formulating an invention.

The invention claimed is:

1. A thermodynamic cycle process system, comprising a central supply electronics that can be connected to an AC voltage source, the central supply electronics having an EMC filter and an input current limiter, a central regulator unit which is connected to a central supply electronics, the central supply electronics producing the supply voltage required for the central regulator unit, at least two heat exchangers, an electronically commutated compressor and a combination of electronic components comprising electronically commutated fans, electronic regulator valves and/or electronically commutated pumps, wherein the electronic components each have an integrated power electronics with a driver, a power output stage as an IGBT switch and a current sensing resistor, which produces the PWM operating voltage required for the electronic components, and wherein the central supply electronics is connected to the individual integrated power electronics for the electronic components and produces the supply voltages required for the respective power electronics, wherein the central supply electronics comprises an intermediate circuit for providing a first supply voltage and two different DC/DC voltage transformers for providing a second and a third supply voltage, and wherein each electronic component comprises an integrated control unit and the central regulator unit is connected to the integrated control units of the electronic components.

2. The thermodynamic cycle process system according to claim 1, wherein the central supply electronics can be connected to a single-phase AC voltage source.

3. The thermodynamic cycle process system according to claim 1, wherein the central supply electronics can be connected to a three-phase AC voltage source.

* * * * *